US009723621B2

United States Patent
Bodas et al.

(10) Patent No.: US 9,723,621 B2
(45) Date of Patent: Aug. 1, 2017

(54) PRIORITY ASSIGNMENT IN FLASHLINQ DISTRIBUTED SCHEDULING ALGORITHM TO FINE-TUNE PERFORMANCE

(71) Applicant: QUALCOMM Incorporated, San Diego, CA (US)

(72) Inventors: Shreeshankar R. Bodas, Piscataway, NJ (US); Saurabh R. Tavildar, Jersey City, NJ (US); Naga Bhushan, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 426 days.

(21) Appl. No.: 13/656,440

(22) Filed: Oct. 19, 2012

(65) Prior Publication Data

US 2014/0112233 A1     Apr. 24, 2014

(51) Int. Cl.
*H04W 72/12*    (2009.01)
*H04W 76/02*    (2009.01)

(52) U.S. Cl.
CPC ... *H04W 72/1231* (2013.01); *H04W 72/1242* (2013.01); *H04W 72/1247* (2013.01); *H04W 76/023* (2013.01); *H04W 72/1278* (2013.01)

(58) Field of Classification Search
CPC ......... H04W 72/1278; H04W 72/1231; H04W 72/1247; H04W 72/1226; H04W 72/1242
USPC .................................................. 370/312, 328
See application file for complete search history.

(56) References Cited

U.S. PATENT DOCUMENTS

| | | | |
|---|---|---|---|
| 2005/0007991 A1* | 1/2005 | Ton et al. | 370/349 |
| 2005/0089001 A1 | 4/2005 | Nishikawa | |
| 2005/0141461 A1* | 6/2005 | Hosein et al. | 370/335 |
| 2007/0282492 A1* | 12/2007 | Valovage et al. | 701/3 |
| 2009/0015478 A1 | 1/2009 | Li et al. | |
| 2009/0017861 A1* | 1/2009 | Wu et al. | 455/522 |
| 2009/0019150 A1 | 1/2009 | Li et al. | |
| 2009/0257351 A1 | 10/2009 | Hande et al. | |
| 2010/0157889 A1* | 6/2010 | Aggarwal et al. | 370/328 |
| 2010/0309854 A1 | 12/2010 | Wu et al. | |
| 2011/0292817 A1* | 12/2011 | Leconte et al. | 370/252 |

(Continued)

OTHER PUBLICATIONS

Jaramillo, et al., "Optimal Scheduling of Real-Time Messages in Peer-to-Peer Wireless Networks," 2011 Conference Record of the Forty Fifth Asilomar Conference on Signals, Systems and Computers (ASILOMAR), Nov. 2011, pp. 1610-1616.

(Continued)

*Primary Examiner* — Jeffrey M Rutkowski
*Assistant Examiner* — Fangyan Deng
(74) *Attorney, Agent, or Firm* — Nerrie M. Zohn

(57) ABSTRACT

A method, a computer program product, and an apparatus are provided. The apparatus determines a degree of a link based on interference observed from at least one other link, determines a priority of the link based on the determined degree, and decides whether to yield based on the determined priority. The priority of the link may further be based on a determined data rate of the link. The apparatus may transmit the priority to another device via a request to send (RTS) signal and/or a clear to send (CTS) signal. The apparatus may also determine a priority associated with an active link and decide whether to yield to the active link by comparing the determined priority of the link with the priority of the active link.

36 Claims, 13 Drawing Sheets

(56) References Cited

U.S. PATENT DOCUMENTS

2012/0020234 A1* 1/2012 Laroia et al. ............... 370/252
2012/0135694 A1* 5/2012 Meier et al. .................. 455/79
2012/0147823 A1 6/2012 Patil et al.
2012/0147857 A1 6/2012 Wu et al.
2012/0252510 A1 10/2012 Wang et al.
2013/0065522 A1* 3/2013 Hwang .................. H04B 5/00
455/41.1

OTHER PUBLICATIONS

Xinzhou Wu et al: "FlashLinQ: A synchronous distributed scheduler for peer-to-peer ad hoc networks", Communication, Control, and Computing (ALLERTON), 2010 48th Annual Allerton Conference on, IEEE, Sep. 29, 2010 (Sep. 29, 2010), pp. 514-521, XP031899421, DOI: 10.1109/ALLERTON.2010.5706950 ISBN: 978-1-4244-8215-3.
International Search Report and Written Opinion—PCT/US2013/065742—ISA/EPO—Apr. 7, 2014.

* cited by examiner

PRIORITY ASSIGNMENT IN FLASHLINQ DISTRIBUTED SCHEDULING ALGORITHM TO FINE-TUNE PERFORMANCE

BACKGROUND

Field

The present disclosure relates generally to communication systems, and more particularly, to evaluating a priority of a device-to-device (D2D) link implementing a FlashLinQ distributed scheduling algorithm to enhance system performance.

Background

A wireless device-to-device communication system, such as FlashLinQ, provides a distributed algorithm for scheduling traffic on D2D links. When two or more links compete/contend to use a resource (e.g., timeslot), FlashLinQ resolves the contention based on the priorities of the links. These priorities may be set randomly at the beginning of each timeslot.

Differential treatment of the D2D links may be useful to achieve a desired system performance. However, different D2D links cannot currently be treated distinctly, for example, based on system-wide considerations. Accordingly, the present disclosure provides a way of modifying FlashLinQ to obtain the desired system performance by fine-tuning priorities of the different D2D links.

SUMMARY

In an aspect of the disclosure, a method, a computer program product, and an apparatus are provided. The apparatus determines a degree of a link based on interference observed from at least one other link, determines a priority of the link based on the determined degree, and decides whether to yield based on the determined priority. The priority of the link may further be based on a determined data rate of the link. The apparatus may transmit the priority to another device via a request to send (RTS) signal and/or a clear to send (CTS) signal. The apparatus may also determine a priority associated with an active link and decide whether to yield to the active link by comparing the determined priority of the link with the priority of the active link.

In a further aspect, the link comprises a first device and a second device. Accordingly, the apparatus determines the degree by determining a first number of links including at least one of a number of links to which the first device can yield or a number of links that can yield to the first device, receiving a second number of links including at least one of a number of links to which the second device can yield or a number of links that can yield to the second device, and determining the degree based on the first number of links and the second number of links.

DETAILED DESCRIPTION

Figure 1:
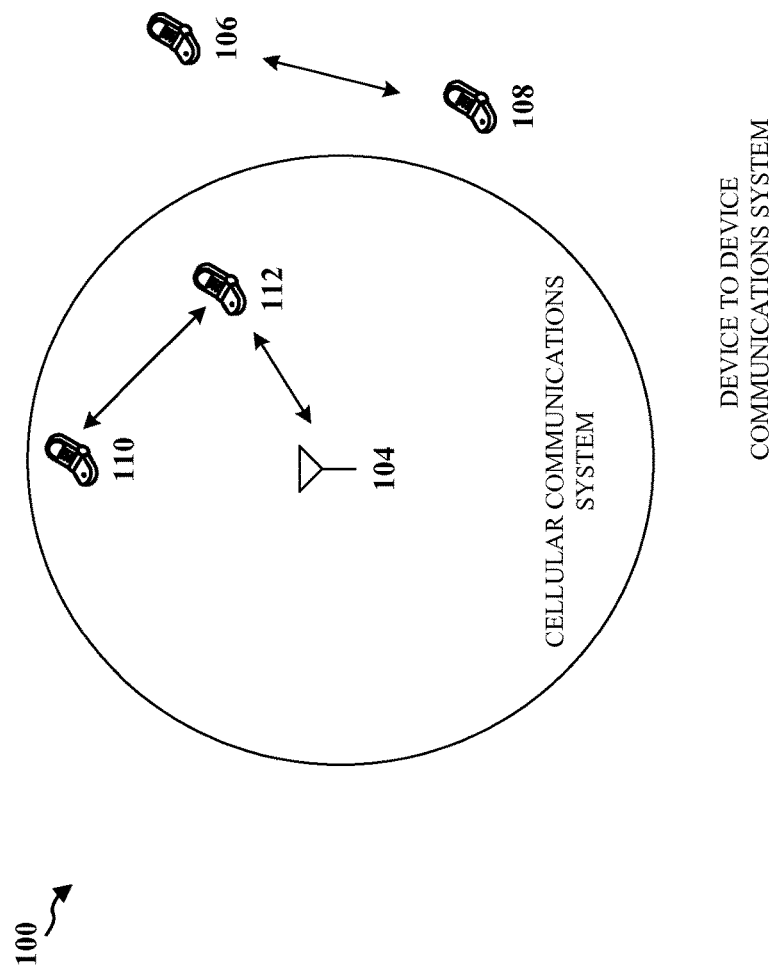
FIG. 1 is a diagram of a wireless device-to-device communications system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

FIG. 1 is a diagram of an exemplary device-to-device (D2D) communications system 100. The D2D communications system 100 includes a plurality of wireless devices 106, 108, 110, 112. The D2D communications system 100 may overlap with a cellular communications system, such as for example, a wireless wide area network (WWAN). Some of the wireless devices 106, 108, 110, 112 may communicate together in D2D (or peer-to-peer) communication, some may communicate with the base station 104, and some may do both. For example, as shown in FIG. 1, the wireless devices 106, 108 are in D2D communication and the wireless devices 110, 112 are in D2D communication. The wireless device 112 is also communicating with the base station 104.

The wireless device may alternatively be referred to by those skilled in the art as user equipment (UE), a mobile station, a subscriber station, a mobile unit, a subscriber unit, a wireless unit, a wireless node, a remote unit, a mobile device, a wireless communication device, a remote device, a mobile subscriber station, an access terminal, a mobile terminal, a wireless terminal, a remote terminal, a handset, a user agent, a mobile client, a client, or some other suitable terminology. The base station may alternatively be referred to by those skilled in the art as an access point, a base transceiver station, a radio base station, a radio transceiver, a transceiver function, a basic service set (BSS), an extended service set (ESS), a Node B, an evolved Node B, or some other suitable terminology.

The exemplary methods and apparatuses discussed infra are applicable to any of a variety of wireless peer-to-peer communications systems, such as for example, a wireless peer-to-peer communication system based on FlashLinQ, WiMedia, Bluetooth, ZigBee, or Wi-Fi based on the IEEE 802.11 standard. To simplify the discussion, the exemplary methods and apparatus are discussed within the context of FlashLinQ. However, one of ordinary skill in the art would understand that the exemplary methods and apparatuses are applicable more generally to a variety of other wireless peer-to-peer communication systems.

Figure 2:
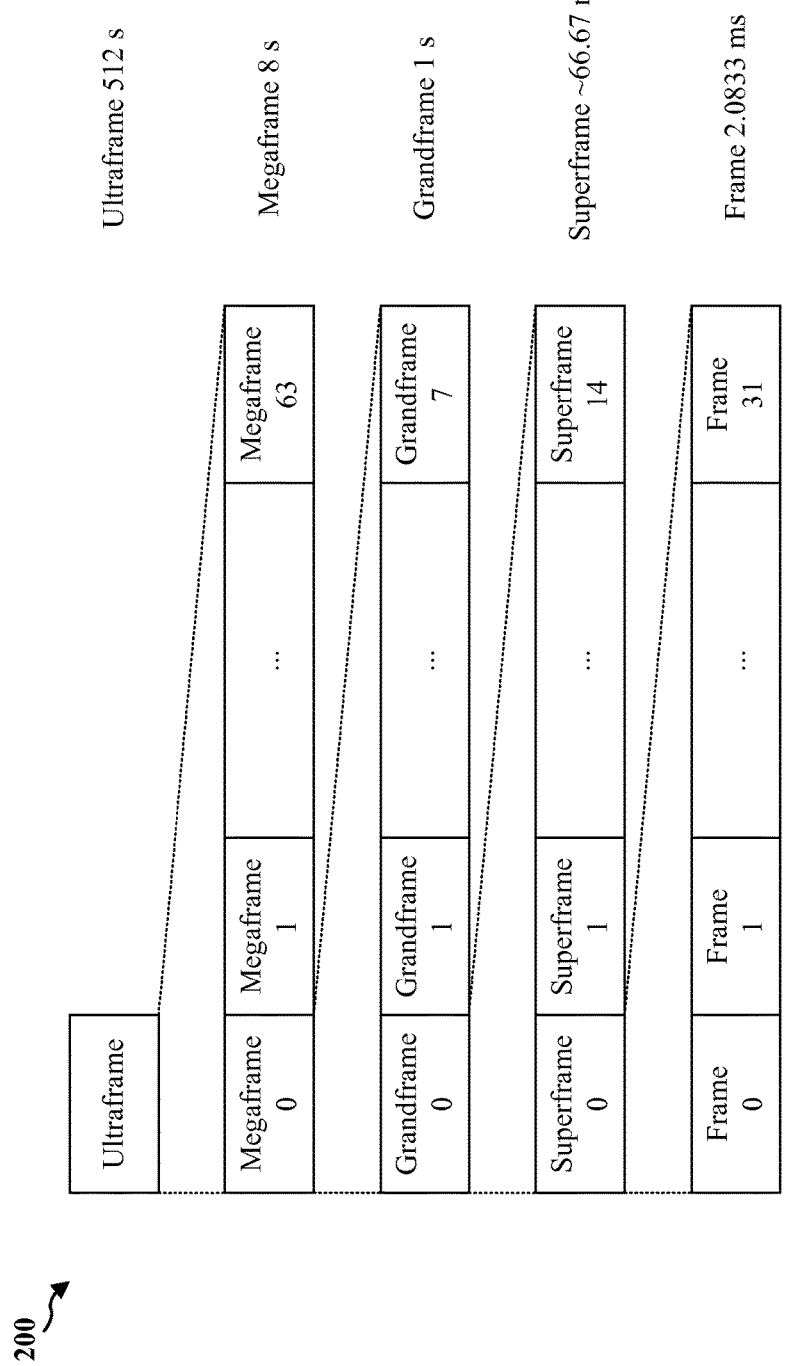
FIG. 2 is a diagram illustrating an exemplary time structure for peer-to-peer communication between the wireless devices.

FIG. 2 is a diagram 200 illustrating an exemplary time structure for D2D (or peer-to-peer) communication between the wireless devices. An ultraframe is 512 seconds and includes 64 megaframes. Each megaframe is eight seconds and includes eight grandframes. Each grandframe is one second and includes 15 superframes. Each superframe is approximately 66.67 ms and includes 32 frames. Each frame is 2.0833 ms.

Figure 3:
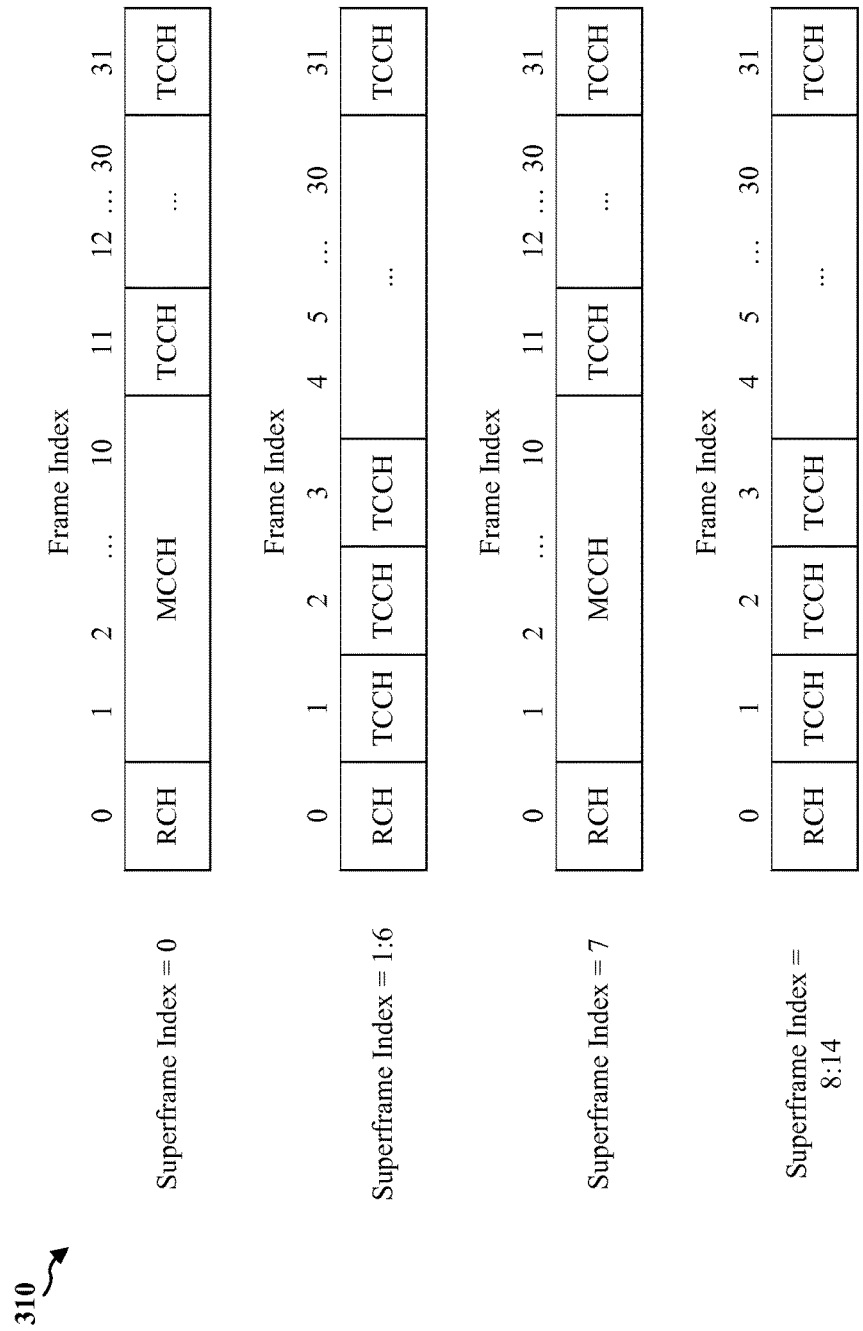
FIG. 3 is a diagram illustrating the channels in each frame of superframes in one grandframe.

FIG. 3 is a diagram 310 illustrating the channels in each frame of superframes in one grandframe. In a first superframe (with index 0), frame 0 is a reserved channel (RCH), frames 1-10 are each a miscellaneous channel (MCCH), and frames 11-31 are each a traffic channel (TCCH). In the $2^{nd}$ through $7^{th}$ superframes (with index 1:6), frame 0 is a RCH and frames 1-31 are each a TCCH. In an $8^{th}$ superframe (with index 7), frame 0 is a RCH, frames 1-10 are each a MCCH, and frames 11-31 are each a TCCH. In the $9^{th}$ through $15^{th}$ superframes (with index 8:14), frame 0 is a RCH and frames 1-31 are each a TCCH. The MCCH of superframe index 0 includes a secondary timing synchronization channel, a peer discovery channel, a peer page channel, and a reserved slot. The MCCH of superframe index 7 includes a peer page channel and reserved slots. The TCCH includes connection scheduling, a pilot, channel quality indicator (CQI) feedback, a data segment, and an acknowledgement (ACK).

Figure 4:
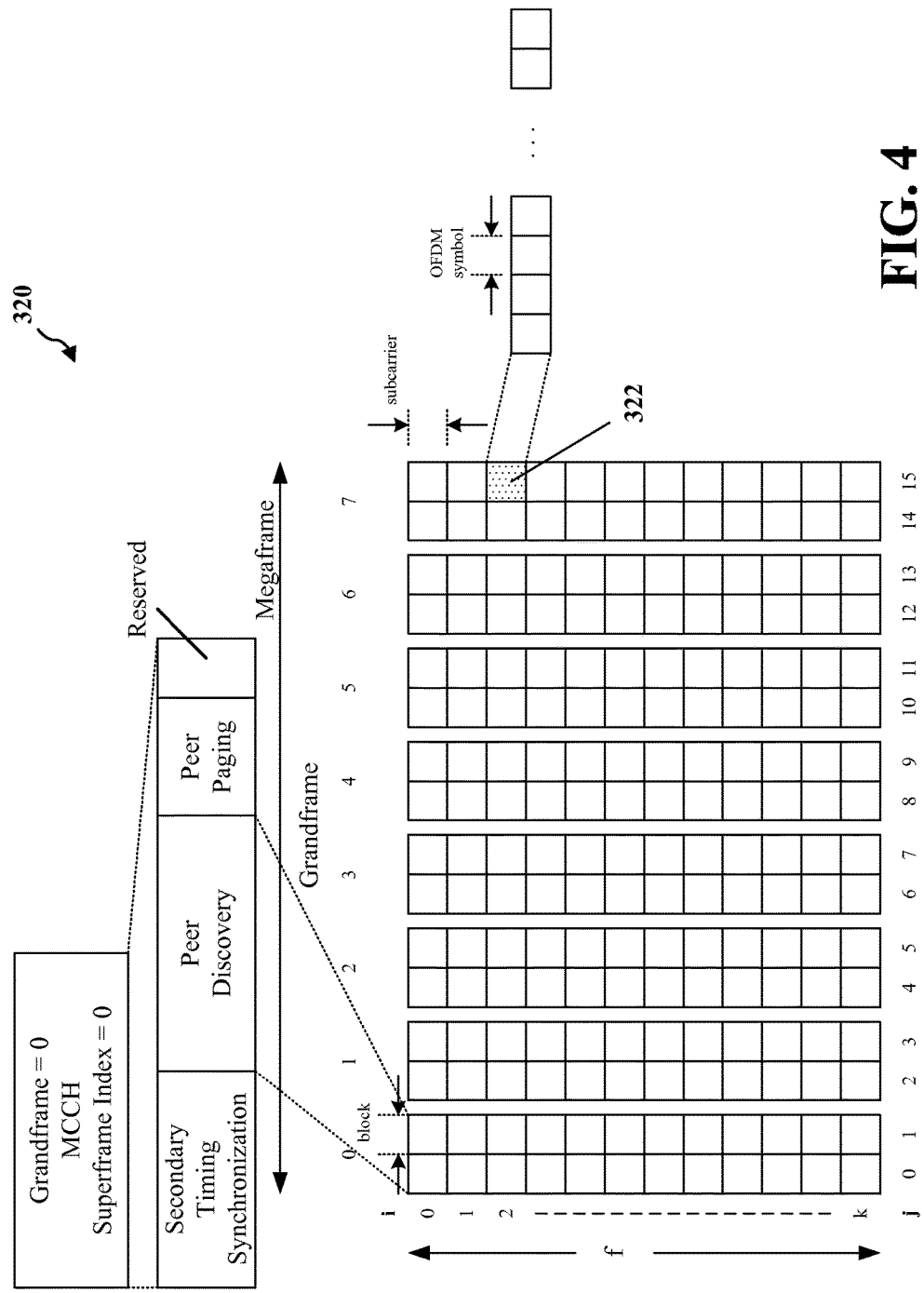
FIG. 4 is a diagram illustrating an operation timeline of a miscellaneous channel and a structure of a peer discovery channel.

FIG. 4 is a diagram 320 illustrating an operation timeline of the MCCH and an exemplary structure of a peer discovery channel. As discussed in relation to FIG. 3, the MCCH of superframe index 0 includes a secondary timing synchronization channel, a peer discovery channel, a peer paging channel, and a reserved slot. The peer discovery channel may be divided into subchannels. For example, the peer discovery channel may be divided into a long range peer discovery channel, a medium range peer discovery channel, a short range peer discovery channel, and other channels. Each of the subchannels may include a plurality of blocks/resources for communicating peer discovery information. Each block may include a plurality of orthogonal frequency-division multiplexing (OFDM) symbols (e.g., 72) at the same subcarrier. FIG. 4 provides an example of a subchannel (e.g., short range peer discovery channel) including blocks in one megaframe, which includes the MCCH superframe index 0 of grandframes 0 through 7. Different sets of blocks correspond to different peer discovery resource identifiers (PDRIDs). For example, one PDRID may correspond to one of the blocks in the MCCH superframe index 0 of one grandframe in the megaframe.

Upon power up, a wireless device listens to the peer discovery channel for a period of time (e.g., two megaframes) and selects a PDRID based on a determined energy on each of the PDRIDs. For example, a wireless device may select a PDRID corresponding to block 322 (i=2 and j=15) in a first megaframe of an ultraframe. The particular PDRID may map to other blocks in other megaframes of the ultraframe due to hopping. In blocks associated with the selected PDRID, the wireless device transmits its peer discovery signal. In blocks unassociated with the selected PDRID, the wireless device listens for peer discovery signals transmitted by other wireless devices.

The wireless device may also reselect a PDRID if the wireless device detects a PDRID collision. That is, a wireless device may listen rather than transmit on its available peer discovery resource in order to detect an energy on the peer discovery resource corresponding to its PDRID. The wireless device may also detect energies on other peer discovery resources corresponding to other PDRIDs. The wireless device may reselect a PDRID based on the determined energy on the peer discovery resource corresponding to its PDRID and the detected energies on the other peer discovery resources corresponding to other PDRIDs.

Figure 5:
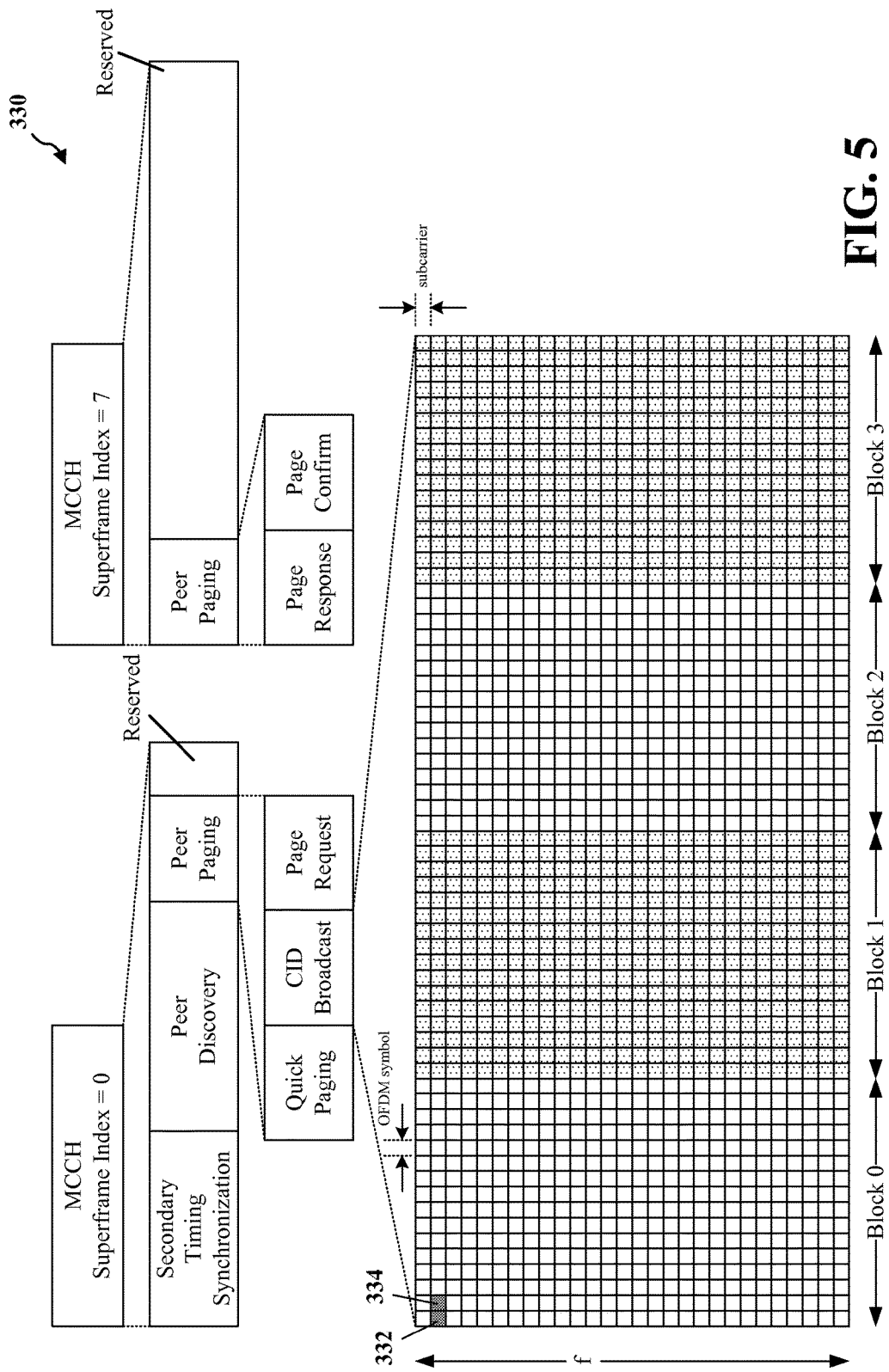
FIG. 5 is a diagram illustrating an operation timeline of a miscellaneous channel and a structure of a connection identifier broadcast.

FIG. 5 is a diagram 330 illustrating an operation timeline of the MCCH and a structure of a connection identifier (CID) broadcast. As discussed in relation to FIG. 3, the MCCH of superframe index 0 includes a secondary timing synchronization channel, a peer discovery channel, a peer paging channel, and a reserved slot. The peer paging channel in the MCCH of superframe index 0 includes a quick paging channel, a CID broadcast channel, and a page request channel. The MCCH of superframe index 7 includes a peer paging channel and a reserved slot. The peer paging channel in the MCCH of superframe index 7 includes a page response channel and a page confirm channel. The CID broadcast channel provides a distributed protocol for CID allocations for new connections, provides a mechanism for CID collision detection, and provides a wireless device evidence that its link connection with a communication peer still exists.

The structure of the CID broadcast consists of four blocks, each of which contains a plurality of resource elements, i.e., a plurality of subcarriers in the frequency domain and OFDM symbols in the time domain. Each of the four blocks spans a plurality of subcarriers (e.g., 28 subcarriers) and includes 16 OFDM symbols. One resource element (or tone) corresponds to one subcarrier and one OFDM symbol.

For each CID, a pair of resource elements in adjacent OFDM symbols is allocated in each of the four blocks for the CID broadcast. In a pair of adjacent resource elements, a first resource element carries an energy proportional to a power used to transmit in the TCCH and a second resource element carries an energy inversely proportional to a power received in the TCCH. For a given CID, each pair of resource elements has a fixed OFDM symbol position and a varying subcarrier within the block that varies each grandframe. In any given link, the wireless device that initiated the link randomly selects a block from Block 0 and Block 2 for the CID broadcast and the other wireless device in the link randomly selects a block from Block 1 and Block 3 for the CID broadcast. As such, for a particular CID, only half of the allocated resources are utilized by a link with that CID. Due to the random selection of a block, a first wireless device in a link with a second wireless device will be able to detect a CID collision when a third wireless device or a fourth wireless device in a different link transmits a CID broadcast using a block different than the block selected by the first wireless device or the second wireless device.

Figure 6:
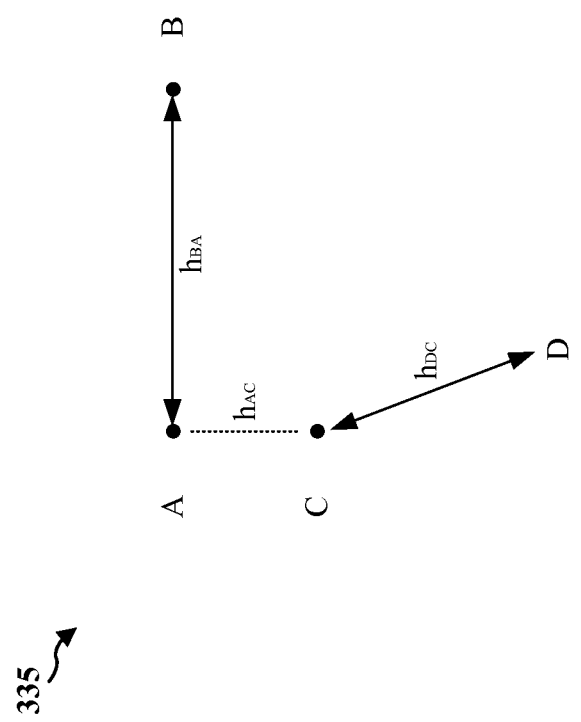
FIG. 6 is a diagram for illustrating the selection of a new connection identifier.

FIG. 6 is a diagram 335 for illustrating the selection of a new CID. Assume a node A and a node B are in a link and the node A with a CID=4 selects Block 0 for the CID broadcast. The node A may be allocated resource elements 332, 334 for the CID broadcast. In resource element 332, the node A transmits at a power $P_A$. In resource element 334, the node A transmits at a power $K/P_B|h_{BA}|^2$, where $h_{BA}$ is the path loss between the node B and the node A and K is a constant known to all the nodes. In a subsequent grandframe, the node A may have a different pair of resource elements with a different subcarrier, but the same relative OFDM symbol position (i.e., in this example, the first and the second OFDM symbol of the selected block). Assume a node C and a node D are in a link and the node C receives the CID broadcast from the node A. The node C receives the transmission in the resource element 332 at a power equal to $P_A|h_{AC}|^2$, where $h_{AC}$ is the path loss between the node A and the node C, and the transmission in the resource element 334 at a power equal to $K|h_{AC}|^2/P_B|h_{BA}|^2$. The node C also receives the CID broadcast from the node D at powers of $P_D|h_{DC}|^2$ and $K/P_C$. If there is a CID collision such that the CID of the nodes C, D is the same as the CID of the nodes A, B, the node C would select a new CID unless the node C expects a reasonable signal to interference ratio (SIR) if scheduled and the node C would not cause too much interference to the node A. That is, the node C selects a new CID if $P_D|h_{DC}|^2/P_A|h_{AC}|^2 \leq \gamma_R$ or $P_C|h_{AC}|^2/P_B|h_{BA}|^2 \leq \gamma_T$, where $\gamma_R$ and $\gamma_T$ are thresholds.

Figure 7:
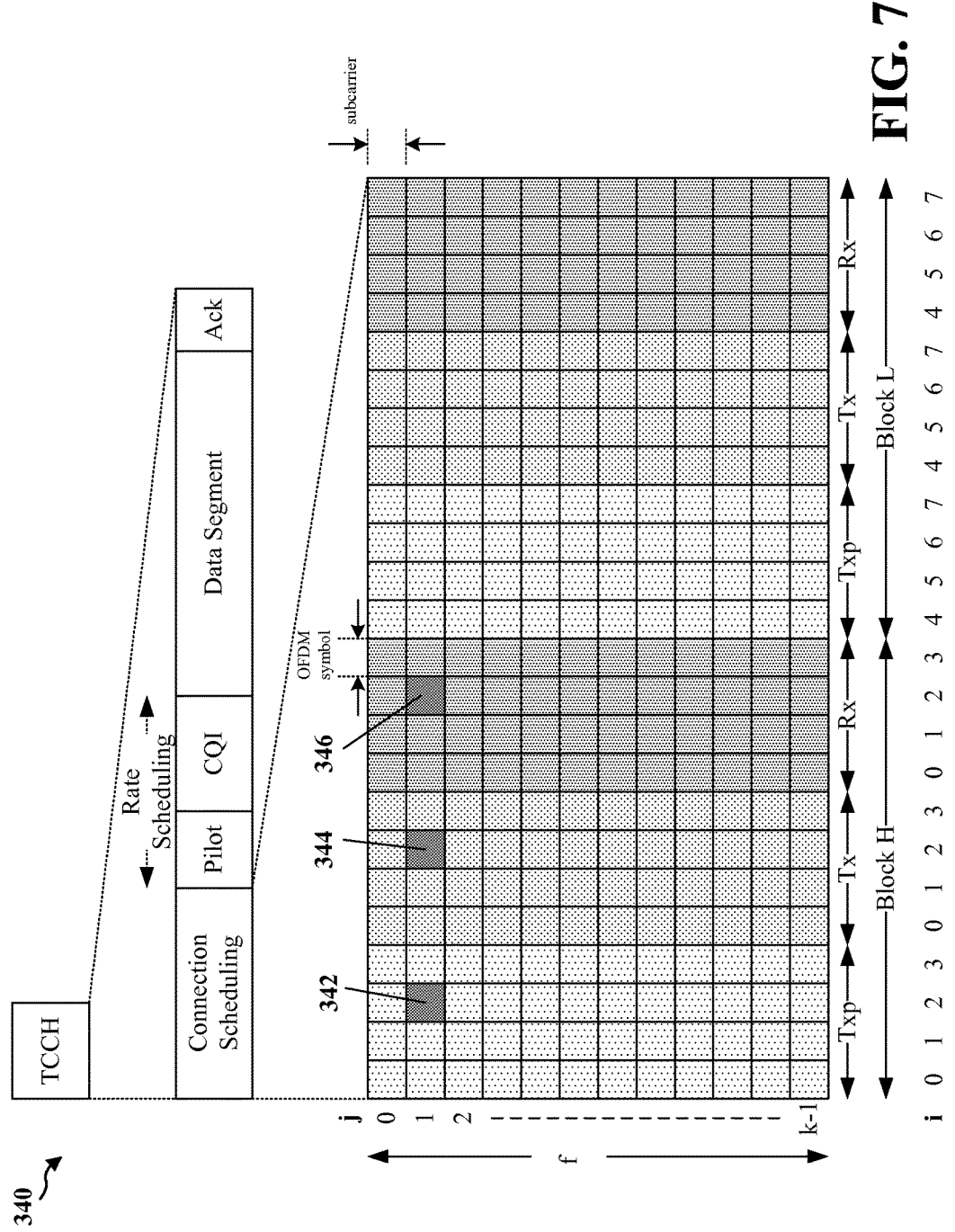
FIG. 7 is a diagram illustrating an operation timeline of a traffic channel slot and a structure of connection scheduling.

FIG. 7 is a diagram 340 illustrating an operation timeline of a TCCH slot and a structure of connection scheduling. As shown in FIG. 7, a TCCH slot includes four subchannels: connection scheduling, rate scheduling, data segment, and ACK. The rate scheduling subchannel includes a pilot segment and a CQI segment. The ACK subchannel is for transmitting an ACK or negative ACK (NACK) in response to data received in the data segment subchannel. The connection scheduling subchannel includes two blocks, a higher priority Block H and a lower priority Block L. Each of Block H and Block L contains a plurality of resource elements, i.e., a plurality of subcarriers in the frequency domain and OFDM symbols in the time domain. Each of Block H and Block L spans the plurality of subcarriers and includes four OFDM symbols in a Txp-block, four OFDM symbols in a Tx-block, and four OFDM symbols in an Rx-block. One resource element (or tone) corresponds to one subcarrier and one OFDM symbol.

Each link has a CID. Based on the CID, for a particular TCCH slot, wireless devices in a link are allocated a resource element in the same respective OFDM symbol position in each of the Txp-block, the Tx-block, and the Rx-block at a particular subcarrier and within Block H or Block L. For example, in a particular TCCH slot, a link with CID=4 may be allocated the resource element 342 in the Txp-block of Block H, the resource element 344 in the Tx-block of Block H, and the resource element 346 in the Rx-block of Block H for transmitting/receiving a scheduling control signal. A transmit request signal in the Tx-block is transmitted with a power equal to a power for transmitting the data segment. A transmit request response signal in the Rx-block is transmitted with a power proportional to an inverse of the power of the received transmit request signal. The allocated trio of resource elements for the Txp-block, Tx-block, and Rx-block vary with respect to the subcarrier (e.g., k different subcarriers) and the respective OFDM symbol in each TCCH slot (e.g., 8 different OFDM symbols—4 in the Block H and 4 in the Block L).

The trio of resource elements allocated to a link dictates the medium access priority of the link. For example, the trio of resource elements 342, 344, 346 corresponds to i=2 and j=1. The medium access priority is equal to ki+j+1, where i is the respective OFDM symbol in each of the Txp, Tx, and Rx subblocks, j is the subcarrier, and k is the number of subcarriers. Accordingly, assuming k=28, the resource elements 342, 344, 346 correspond to a medium access priority of 58.

Figure 8:
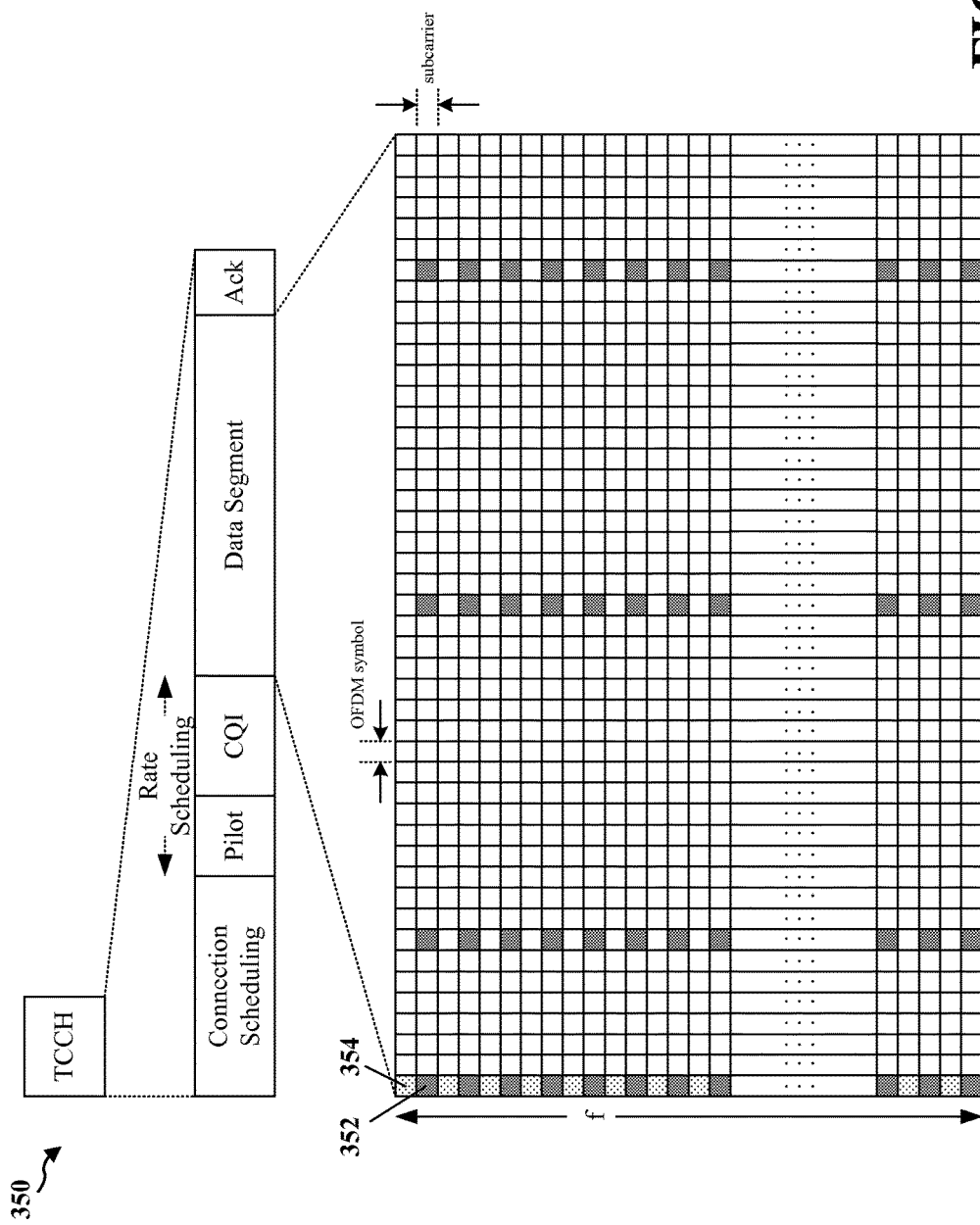
FIG. 8 is a diagram illustrating a structure of a data segment.

FIG. 8 is a diagram 350 illustrating a structure of the data segment. The data segment contains a plurality of resource elements spanning a plurality of subcarriers in the frequency domain and OFDM symbols in the time domain. Some of the resource elements in the data segment, such as resource element 354, may carry rate indicator information regarding the coding and/or modulation used for the data segment. Other resource elements in the data segment, such as resource element 352, may carry a pilot to allow for estimating the channel for demodulation and decoding.

Figure 9B:
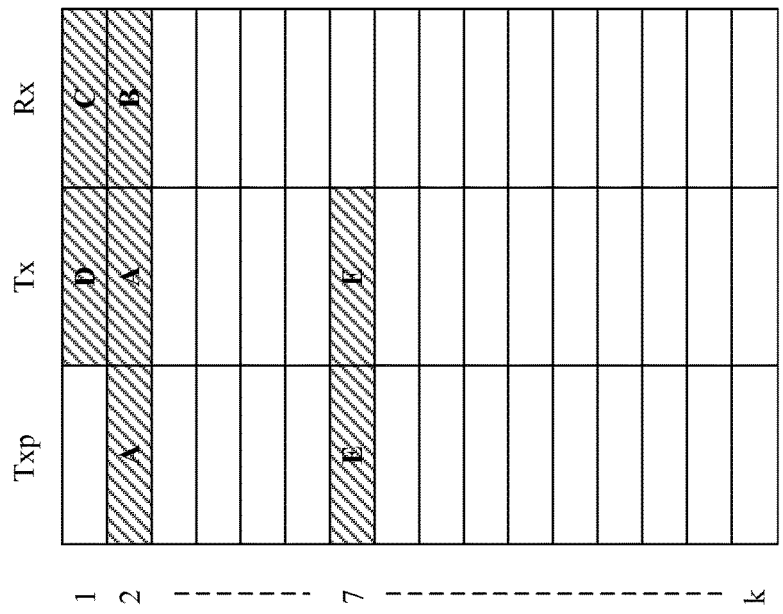
FIG. 9B is a second diagram for illustrating a connection scheduling signaling scheme for the wireless devices.
Figure 9A:
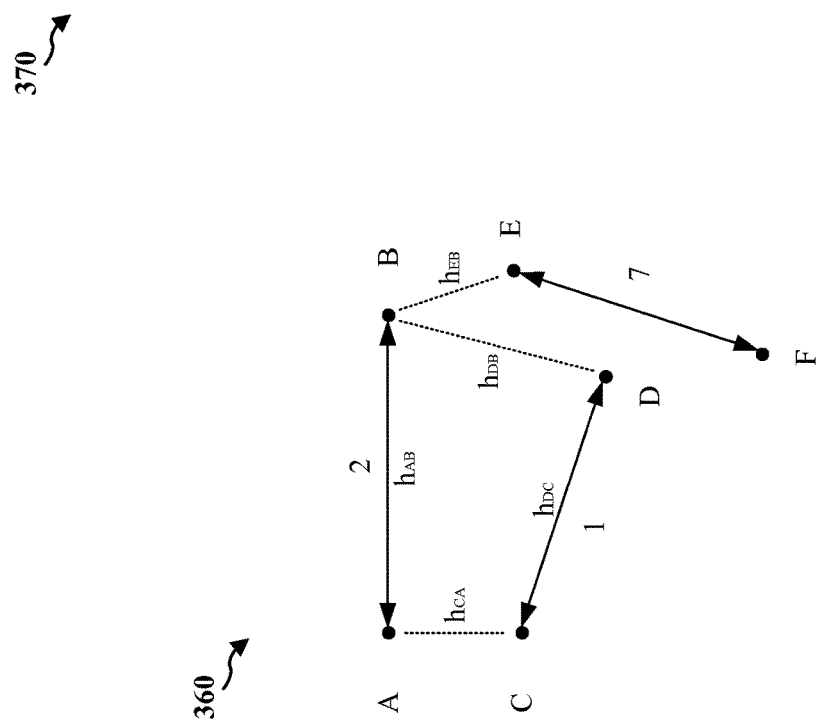
FIG. 9A is a first diagram for illustrating a connection scheduling signaling scheme for the wireless devices.

FIG. 9A is a first diagram 360 for illustrating an exemplary connection scheduling signaling scheme for the wireless devices. As shown in FIG. 9A, wireless device A is communicating with wireless device B, wireless device C is communicating with wireless device D, and wireless device E is communicating with wireless device F. The wireless device A is assumed to have transmit priority over the wireless device B, the wireless device C is assumed to have transmit priority over the wireless device D, and the wireless device E is assumed to have transmit priority over the wireless device F. Each of the links has a different medium access priority depending on the particular slot for communication. For the particular slot for communication, link 1 (A, B) is assumed to have a medium access priority of 2, link 2 (C, D) is assumed to have a medium access priority of 1, and link 3 (E, F) is assumed to have a medium access priority of 7.

FIG. 9B is a second diagram 370 for illustrating an exemplary connection scheduling signaling scheme for the wireless devices. FIG. 9B shows connection scheduling resources of first respective OFDM symbols (i=0, see FIG. 7) of Txp, Tx, and Rx subblocks in Block H (corresponding to medium access priorities 1 through k) in the connection scheduling subchannel. The connection scheduling resources include a plurality of subcarriers, each of the subcarriers corresponding to one of k frequency bands. Each of the frequency bands corresponds to a particular medium access priority. One block in the connection scheduling resources is split into three subblocks/phases: Txp, Tx, and Rx. The Txp-block is used by the node with transmit priority in the link to indicate whether the node with transmit priority will act as a transmitter or a receiver. If the node with transmit priority transmits on the allocated OFDM symbol in the Txp-block, the node with transmit priority indicates to the node without transmit priority an intent to act as a transmitter. If the node with transmit priority does not transmit on the allocated OFDM symbol in the Txp-block, the node with transmit priority indicates to the node without transmit priority an intent to act as a receiver. The Tx-block is used by potential transmitters to make a request to be scheduled. The transmitter transmits a direct power signal on the allocated OFDM symbol in the Tx-block at a power equal to a power used for the traffic channel (i.e., a power for transmitting the data segment). Each potential receiver listens to the tones in the Tx-blocks, compares the received power on each of the Tx-blocks to the received power on the Tx-block allocated to the transmitter of its own link, and determines whether to Rx-yield based on its own link medium access priority relative to other link medium access priorities and the comparison.

For example, assume the nodes A, D, and E transmit a transmit request signal in the Tx-block at a power equal to $P_A$, $P_D$, and $P_E$, respectively. The node B receives the transmit request signal from the node A at a power equal to $P_A |h_{AB}|^2$, where $h_{AB}$ is the path loss between the node A and the node B. The node B receives the transmit request signal from the node D with a power equal to $P_D |h_{DB}|^2$, where $h_{DB}$ is the path loss between the node D and the node B. The node B receives the transmit request signal from the node E with a power equal to $P_E |h_{EB}|^2$, where $h_{EB}$ is the path loss between the node E and the node B. The node B compares the power of the received transmit request signal from the node A divided by the sum of the powers of the received transmit request signals from other nodes with a higher priority to a threshold in order to determine whether to Rx-yield. The node B does not Rx-yield if the node B expects a reasonable SIR if scheduled. That is, the node B Rx-yields unless $P_A |h_{AB}|^2 / P_D |h_{DB}|^2 > \gamma_{RX}$, where $\gamma_{RX}$ is the threshold (e.g., 9 dB).

The Rx-block is used by the potential receivers. If the receiver chooses to Rx-yield, the receiver does not transmit in the allocated OFDM symbol in the Rx-block; otherwise, the receiver transmits an inverse echo power signal in the allocated OFDM symbol in the Rx-block at a power proportional to an inverse of the power of the received direct power signal from the transmitter of its own link. All of the transmitters listen to the tones in the Rx-block to determine whether to Tx-yield transmission of the data segment.

For example, the node C, having received the transmit request signal from the node D at a power equal to $P_D |h_{DC}|^2$, transmits a transmit request response signal in the Rx-block at a power equal to $K/P_D |h_{DC}|^2$, where $h_{DC}$ is the path loss between the node D and the node C, and K is a constant known to all nodes. The node A receives the transmit request response signal from the node C at a power equal to $K |h_{CA}|^2 / P_D |h_{DC}|^2$, where $h_{CA}$ is the path loss between the node C and the node A. The node A Tx-yields if the node A would cause too much interference to the node C. That is, the node A Tx-yields unless $P_D |h_{DC}|^2 / P_A |h_{CA}|^2 > \gamma_{TX}$, where $\gamma_{TX}$ is a threshold (e.g., 9 dB).

The connection scheduling signaling scheme is best described in conjunction with an example. The node C has no data to transmit and does not transmit in the Txp-block for medium access priority 1, the node A has data to transmit and transmits in the Txp-block for medium access priority 2, and the node E has data to transmit and transmits in the Txp-block for medium access priority 7. The node D has data to transmit and transmits in the Tx-block for medium access priority 1, the node A transmits in the Tx-block for medium access priority 2, and the node E transmits in the Tx-block for medium access priority 7. The node C listens to the tones in the Tx-blocks and determines to transmit in the Rx-block for medium access priority 1, as the node C has the highest priority. The node B listens to the tones in the Tx-blocks, determines that its link would not interfere with link 2, which has a higher medium access priority, and transmits in the Rx-block for medium access priority 2. The node F listens to the tones in the Tx-blocks, determines that its link would interfere with link 1 and/or link 2, both of which have a higher medium access priority, and Rx-yields by not transmitting in the Rx-block for medium access priority 7. Subsequently, both D and A listen to the tones in the Rx blocks to determine whether to transmit the data. Because D has a higher link medium access priority than A, D transmits its data. A will Tx-yield transmission of the data if A determines that its transmission would interfere with the transmission from D.

In an aspect, a number of links conflicting with a D2D link T-R may be computed. The D2D link T-R may include a transmitting UE (transmitter T) and a receiving UE (receiver R). Accordingly, for every D2D link T-R, the transmitter T and the receiver R may need to know the number of links that would yield to the link T-R, and the number of links to which the link T-R would yield.

After a request-to-send (RTS) phase in a FlashLinQ operation, the receiver R may learn of a first number of links that would Tx-yield to the receiver R. The receiver R may then send a clear-to-send (CTS) signal with a power equal to an inverse power echo. This enables the transmitter T to determine a second number of links to which the transmitter T would Tx-yield.

The transmitter T may inform the receiver R of the second number of links to which the transmitter T would Tx-yield. Similarly, the receiver R may inform the transmitter T of the first number of links that would Tx-yield to the receiver R. The sum of the first number of links and second number of links may equal a total number of links that the link T-R is in conflict with. The computation described above may be performed over a slow time scale, e.g., once every second.

In an aspect, a priority of a D2D link may be determined based on two factors: (1) a marginal increment in the link's utility if the link is scheduled for transmission; and (2) a number of links conflicting with the link (e.g., degree of the link). The marginal utility of a link may depend on the link's long-term rate (e.g., marginal utility is a ratio/derivative/ scalar of long-term rate), and may be determined (or updated) by every link for itself on a fast time scale.

A RTS signal may be sent by contending D2D transmitters, and may contain the priority of a given link. Priority may be defined by equation (1) below:

$$\text{Priority} = (\text{marginal utility})/(1 + \text{number of conflicting links}). \quad (1)$$

A conflict graph may be a useful abstraction in accordance with the disclosure. In the conflict graph, every link may be represented by a node, and two nodes may be connected by an edge if the corresponding links are in conflict with each other. The number of conflicting links may be considered as the degree of the link in the conflict graph.

In an aspect, all links may determine their degree based on observed interference from other links. At each time, each link may determine its priority based on its long term rate and degree. The priority may be broadcast along with RTS/CTS signals, or may be determined via a slow-time broadcast of degree and a fast-time broadcast of marginal utility. The priorities may be used for making yielding decisions for scheduling.

Figure 10:
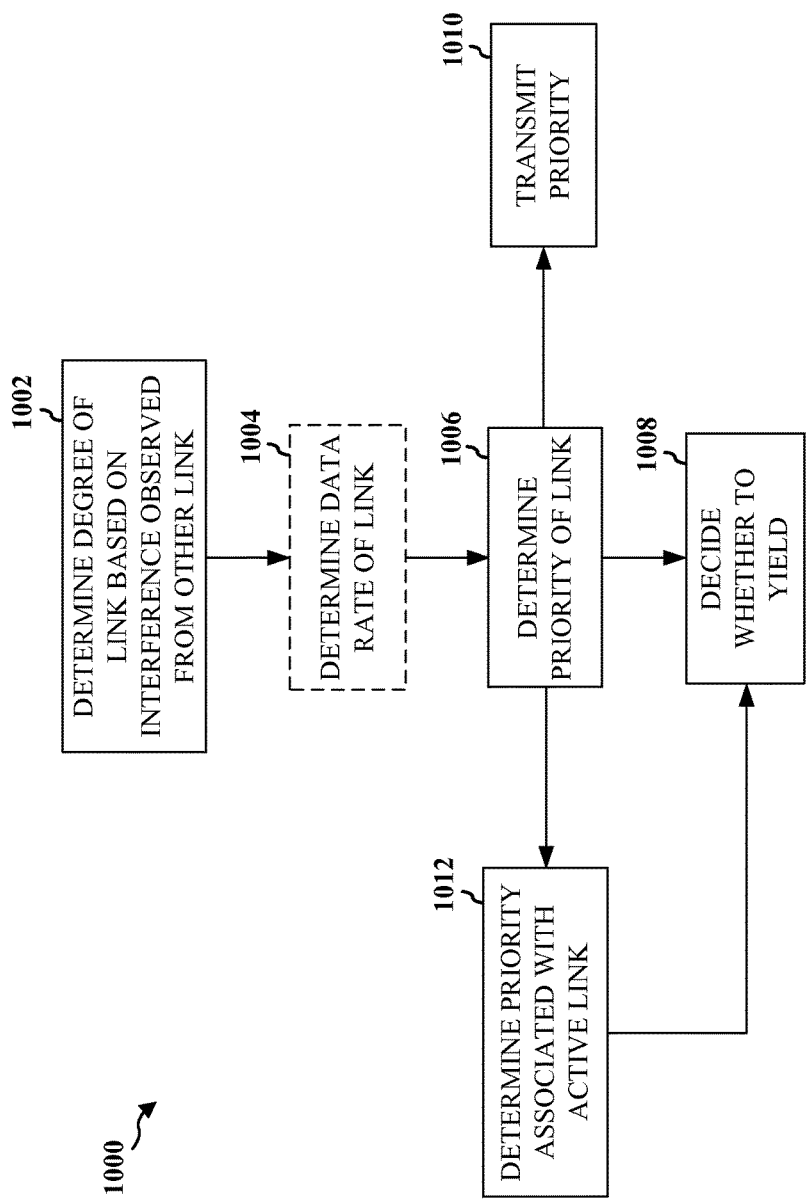
FIG. 10 is a flow chart of a method of wireless communication.

FIG. 10 is a flow chart 1000 of a method of wireless communication. The method may be performed by a wireless device. As shown in FIG. 10, at step 1002, the wireless device determines a degree of a link the wireless is device is part of based on interference observed from at least one other link. The degree of the link may be a number of links conflicting with the link, and determined at a maximum rate of once every second. At step 1004, the wireless device may optionally determine a data rate of the link. The data rate may be determined at a minimum rate of once every 100 milliseconds.

At step 1006, the wireless device determines a priority of the link based on the determined degree. The priority of the link may be determined based further on the determined data rate of the link. At step 1008, the wireless device decides whether to yield to another device or link based on the determined priority. In an aspect, the type of "yielding" performed by the wireless device may be a Tx-yield or an Rx-yield depending on whether the wireless device is a transmitter or a receiver.

In an aspect, at step 1010, the wireless device may transmit the determined priority to another device via a reservation signal (e.g., request to send (RTS) signal) and/or a confirmation signal (e.g., clear to send (CTS) signal). In a further aspect, at step 1012, the wireless device may determine a priority associated with an active link. The active link may, or may not, be one of the links from which the wireless device determines the link degree based on an observed interference. At step 1008, the wireless device may then decide whether to yield to the active link by comparing the determined priority of the link with the priority of the active link.

The priority associated with the active link may be determined by receiving a slow-time broadcast of a degree and a fast-time broadcast of information based on a data rate. The broadcast of the information may be received at a rate faster than a rate at which the broadcast of the degree is received. The priority associated with the active link may also be determined by receiving a reservation signal such as a RTS signal, or a confirmation signal such as a CTS signal.

Figure 11:
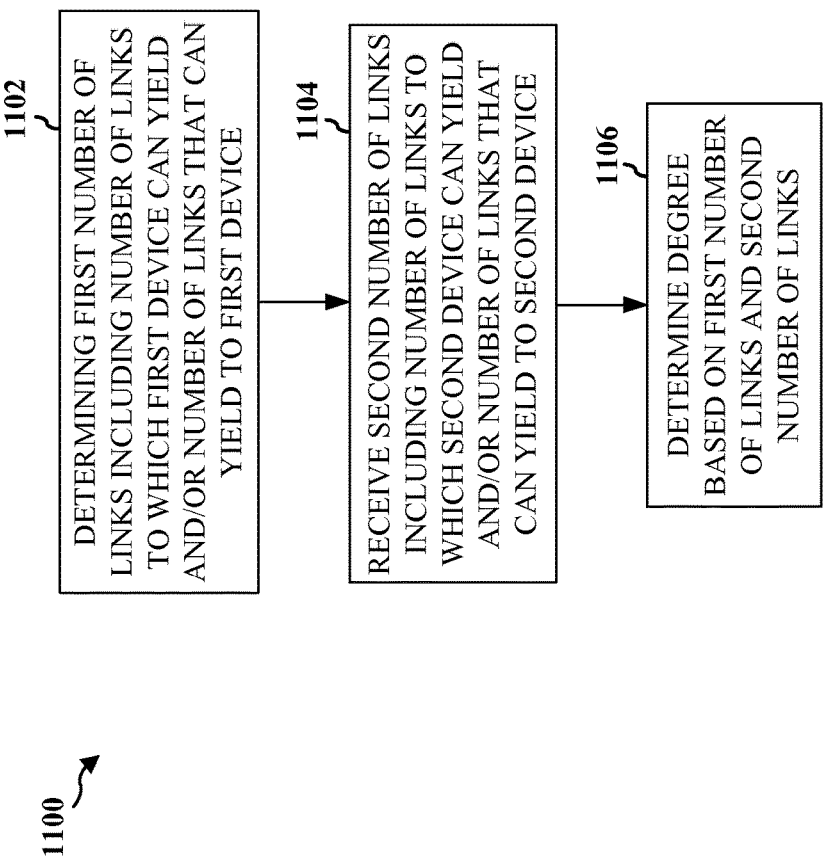
FIG. 11 is a flow chart of a method of wireless communication.

FIG. 11 is a flow chart 1100 of a method of wireless communication. The method describes in further detail step 1002 of FIG. 10 for determining a degree of a link, and may be performed by a wireless device. In the method of FIG. 11, the link comprises a first device and a second device, wherein the wireless device performing the method may be the first device.

At step 1102, the wireless device determines a first number of links including a number of links to which the first device can yield and/or a number of links that can yield to the first device. At step 1104, the wireless device receives a second number of links including a number of links to which the second device can yield and/or a number of links that can yield to the second device. At step 1106, the wireless device determines the degree based on the first number of links and the second number of links.

Figure 12:
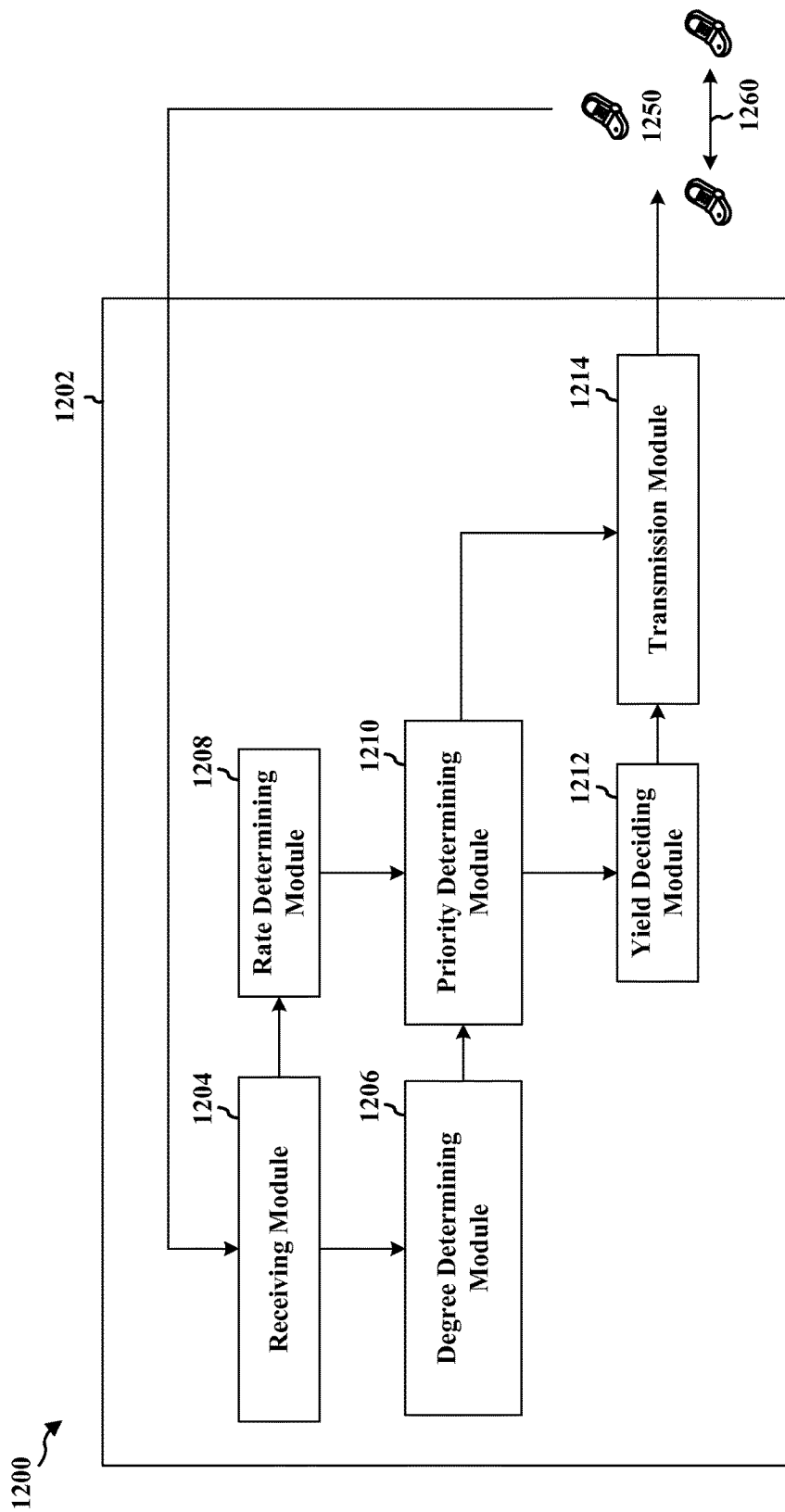
FIG. 12 is a conceptual data flow diagram illustrating the data flow between different modules/means/components in an exemplary apparatus.

FIG. 12 is a conceptual data flow diagram 1200 illustrating the data flow between different modules/means/components in an exemplary apparatus 1202. The apparatus 1202 may be a wireless device. The apparatus 1202 includes a receiving module 1204, a degree determining module 1206, a rate determining module 1208, a priority determining module 1210, a yielding module 1212, and a transmission module 1214.

The degree determining module 1206 determines a degree of a link the apparatus 1202 is a part of based on interference observed from at least one other link, such as link 1260. The degree of the link may be a number of links conflicting with the link, and determined at a maximum rate of once every second. The rate determining module 1208 may optionally determine a data rate of the link. The data rate may be determined at a minimum rate of once every 100 milliseconds.

The priority determining module 1210 determines a priority of the link based on the degree determined by the degree determining module 1206. The priority of the link may be determined based further on the data rate of the link determined by the rate determining module 1208. The yield deciding module 1212 decides whether to yield to another device or link based on the priority determined by the priority determining module 1210. In an aspect, the type of "yielding" performed by the yield deciding module 1212 may be a Tx-yield or an Rx-yield depending on whether the apparatus 1202 is a transmitter or a receiver.

In an aspect, the priority determining module 1210 may transmit the determined priority via the transmission module 1214 to another device, such as the wireless device 1250 or any of the devices of the link 1260. The priority may be transmitted via a reservation signal (e.g., request to send (RTS) signal) and/or a confirmation signal (e.g., clear to send (CTS) signal).

In a further aspect, the priority determining module 1210 may determine a priority associated with an active link. The active link may, or may not, be one of the links from which the degree determining module 1206 determines the link degree based on an observed interference. Accordingly, the yield deciding module 1212 may then decide whether to yield to the active link by comparing the determined priority of the link with the priority of the active link.

The priority associated with the active link may be determined by receiving a slow-time broadcast of a degree and a fast-time broadcast of information based on a data rate. The broadcast of the information may be received at a rate faster than a rate at which the broadcast of the degree is received. The priority associated with the active link may also be determined by receiving a reservation signal such as a RTS signal, or a confirmation signal such as a CTS signal.

In another aspect, the link comprises a first device and a second device, wherein the apparatus 1202 may be the first device and the device 1250 may be the second device. Accordingly, the degree determining module 1206 determines a first number of links including a number of links to which the first device can yield and/or a number of links that can yield to the first device. The degree determining module 1206 may also receive, via the receiving module 1204, a second number of links including a number of links to which the second device can yield and/or a number of links that can yield to the second device. Thereafter, the degree determining module 1206 determines the degree based on the first number of links and the second number of links.

The apparatus may include additional modules that perform each of the steps of the algorithm in the aforementioned flow charts FIGS. 10-11. As such, each step in the aforementioned flow charts FIGS. 10-11 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 13:
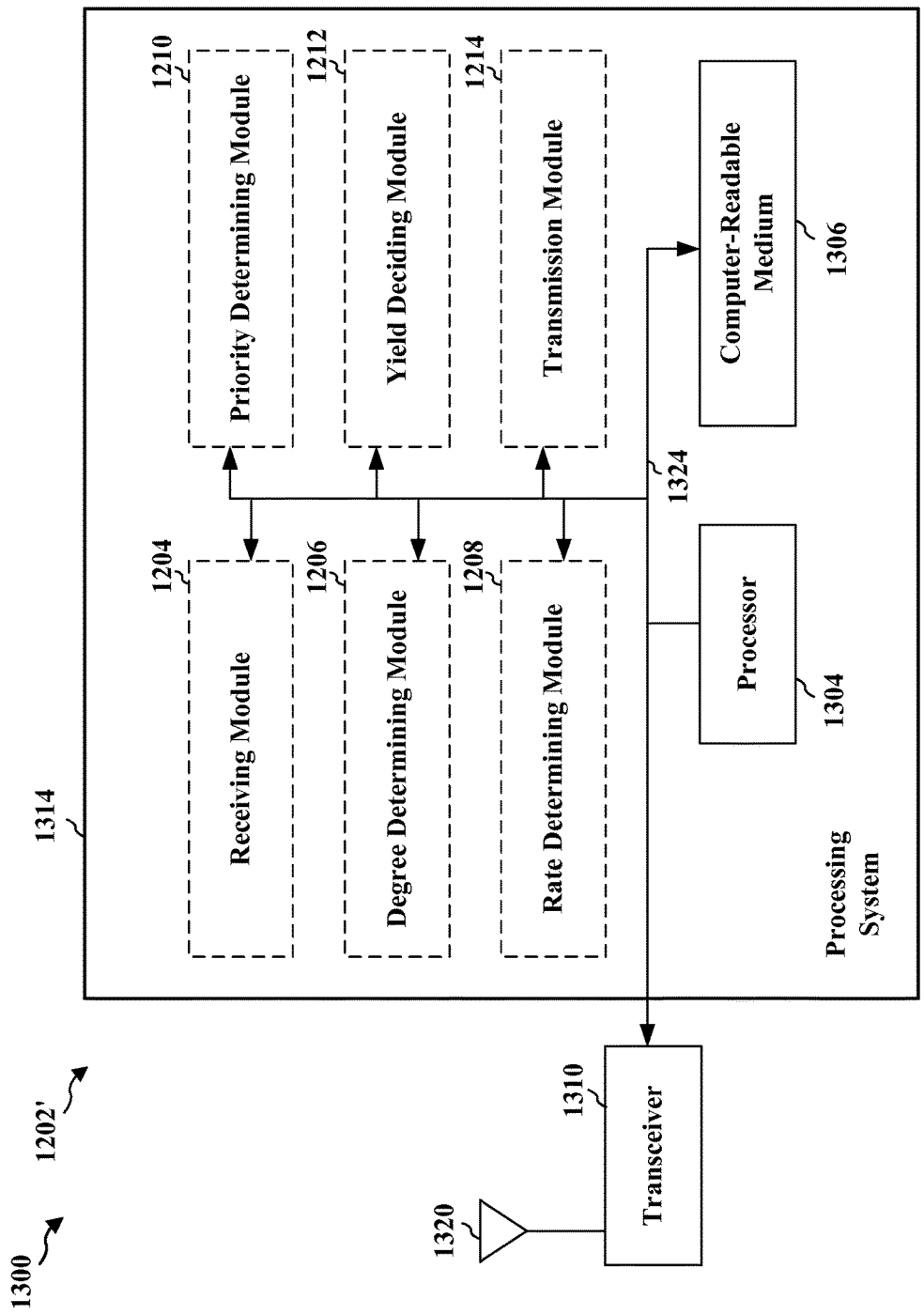
FIG. 13 is a diagram illustrating an example of a hardware implementation for an apparatus employing a processing system.

FIG. 13 is a diagram illustrating an example of a hardware implementation for an apparatus 1202' employing a processing system 1314. The processing system 1314 may be implemented with a bus architecture, represented generally by the bus 1324. The bus 1324 may include any number of interconnecting buses and bridges depending on the specific application of the processing system 1314 and the overall design constraints. The bus 1324 links together various circuits including one or more processors and/or hardware modules, represented by the processor 1304, the modules 1204, 1206, 1208, 1210, 1212, 1214, and the computer-readable medium 1306. The bus 1324 may also link various other circuits such as timing sources, peripherals, voltage regulators, and power management circuits, which are well known in the art, and therefore, will not be described any further.

The processing system 1314 may be coupled to a transceiver 1310. The transceiver 1310 is coupled to one or more antennas 1320. The transceiver 1310 provides a means for communicating with various other apparatus over a transmission medium. The processing system 1314 includes a processor 1304 coupled to a computer-readable medium 1306. The processor 1304 is responsible for general processing, including the execution of software stored on the computer-readable medium 1306. The software, when executed by the processor 1304, causes the processing system 1314 to perform the various functions described supra for any particular apparatus. The computer-readable medium 1306 may also be used for storing data that is manipulated by the processor 1304 when executing software. The processing system further includes at least one of the modules 1204, 1206, 1208, 1210, 1212, and 1214. The modules may be software modules running in the processor 1304, resident/stored in the computer readable medium 1306, one or more hardware modules coupled to the processor 1304, or some combination thereof.

In one configuration, the apparatus 1202/1202' for wireless communication includes means for determining a degree of a link based on interference observed from at least one other link, means for determining a priority of the link based on the determined degree, means for deciding whether to yield based on the determined priority, means for determining a data rate of the link, wherein the priority of the link is further based on the determined data rate of the link, means for transmitting the priority via at least one of a request to send (RTS) signal or a clear to send (CTS) signal, means for determining a priority associated with an active link, and means for deciding whether to yield to the active link by comparing the determined priority of the link with the priority of the active link.

The aforementioned means may be one or more of the aforementioned modules of the apparatus 1202 and/or the processing system 1314 of the apparatus 1202' configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication at a first device, comprising:
   determining a degree of a link based on interference observed from at least one other link;
   determining a data rate of the link;
   determining a medium access priority of the link based on a combination of the data rate of the link and the degree of the link, the medium access priority of the link corresponding to one or more resource elements allocated to the link, wherein the medium access priority is based on a ratio corresponding to the data rate of the link and the degree of the link; and
   yielding based on the medium access priority of the link.

2. The method of claim 1, wherein the degree of the link is determined at a maximum rate of once every second.

3. The method of claim 1, wherein the data rate is determined at a minimum rate of once every 100 milliseconds.

4. The method of claim 1, further comprising:
   transmitting the medium access priority via at least one of a request to send (RTS) signal or a clear to send (CTS) signal.

5. The method of claim 1, further comprising:
   determining a priority associated with an active link; and
   yielding to the active link by comparing the determined priority of the link with the priority of the active link.

6. The method of claim 5, wherein the priority associated with the active link is determined by receiving a slow-time broadcast of information of conflicting links of the active link and a fast-time broadcast of information based on a data rate, and wherein the broadcast of the information based on the data rate is received at a rate faster than a rate at which the broadcast of the information of the conflicting links is received.

7. The method of claim 5, wherein the priority associated with the active link is determined by receiving a request to send (RTS) signal or a clear to send (CTS) signal.

8. An apparatus for wireless communication comprising:
means for determining a degree of a link based on interference observed from at least one other link;
means for determining a data rate of the link;
means for determining a medium access priority of the link based on a combination of a the data rate of the link and the degree of the link, the medium access priority of the link corresponding to one or more resource elements allocated to the link, wherein the medium access priority is based on a ratio corresponding to the data rate of the link and the degree of the link; and
means for yielding based on the medium access priority of the link.

9. The apparatus of claim 8, wherein the degree of the link is determined at a maximum rate of once every second.

10. The apparatus of claim 8, wherein the data rate is determined at a minimum rate of once every 100 milliseconds.

11. The apparatus of claim 8, further comprising:
means for transmitting the medium access priority via at least one of a request to send (RTS) signal or a clear to send (CTS) signal.

12. The apparatus of claim 8, further comprising:
means for determining a priority associated with an active link; and
means for yielding to the active link by comparing the determined priority of the link with the priority of the active link.

13. The apparatus of claim 12, wherein the priority associated with the active link is determined by receiving a slow-time broadcast of information of conflicting links of the active link and a fast-time broadcast of information based on a data rate, and wherein the broadcast of the information based on the data rate is received at a rate faster than a rate at which the broadcast of the information of the conflicting links is received.

14. The apparatus of claim 12, wherein the priority associated with the active link is determined by receiving a request to send (RTS) signal or a clear to send (CTS) signal.

15. An apparatus for wireless communication comprising:
a memory; and
at least one processor coupled to the memory and configured to:
determine a degree of a link based on interference observed from at least one other link;
determine a data rate of the link;
determine a medium access priority of the link based on a combination of the data rate of the link and the degree of the link, the medium access priority of the link corresponding to one or more resource elements allocated to the link, wherein the medium access priority is based on a ratio corresponding to the data rate of the link and the degree of the link; and
yield based on the medium access priority of the associated link.

16. The apparatus of claim 15, wherein the degree of the link is determined at a maximum rate of once every second.

17. The apparatus of claim 15, wherein the data rate is determined at a minimum rate of once every 100 milliseconds.

18. The apparatus of claim 15, the processing system further configured to:
transmit the medium access priority via at least one of a request to send (RTS) signal or a clear to send (CTS) signal.

19. The apparatus of claim 15, the processing system further configured to:
determine a priority associated with an active link; and
yield to the active link by comparing the determined priority of the link with the priority of the active link.

20. The apparatus of claim 19, wherein the priority associated with the active link is determined by receiving a slow-time broadcast of information of conflicting links of the active link and a fast-time broadcast of information based on a data rate, and wherein the broadcast of the information based on the data rate is received at a rate faster than a rate at which the broadcast of the information of the conflicting links is received.

21. The apparatus of claim 19, wherein the priority associated with the active link is determined by receiving a request to send (RTS) signal or a clear to send (CTS) signal.

22. A non-transitory computer-readable medium storing computer executable code for wireless communication, the non-transitory computer-readable medium comprising code, when executed by a processor, that causes the processor to perform operations of:
determining a degree of a link based on interference observed from at least one other link;
determining a data rate of the link;
determining a medium access priority of the link based on a combination of the data rate of the link and the degree of the link, the medium access priority of the link corresponding to one or more resource elements allocated to the link, wherein the medium access priority is based on a ratio corresponding to the data rate of the link and the degree of the link; and
yielding based on the medium access priority of the link.

23. The non-transitory computer-readable medium of claim 22, wherein the degree of the link is determined at a maximum rate of once every second.

24. The non-transitory computer-readable medium of claim 22, wherein the data rate is determined at a minimum rate of once every 100 milliseconds.

25. The non-transitory computer-readable medium of claim 22, the computer-readable medium further comprising code, when executed by the processor, that causes the processor to perform operations of:
transmitting the medium access priority via at least one of a request to send (RTS) signal or a clear to send (CTS) signal.

26. The non-transitory computer-readable medium of claim 22, the computer-readable medium further comprising code, when executed by the processor, that causes the processor to perform operations of:
determining a priority associated with an active link; and
yielding to the active link by comparing the determined priority of the link with the priority of the active link.

27. The non-transitory computer-readable medium of claim 26, wherein the priority associated with the active link is determined by receiving a slow-time broadcast of information of conflicting links of the active link and a fast-time broadcast of information based on a data rate, and wherein the broadcast of the information based on the data rate is received at a rate faster than a rate at which the broadcast of the information of the conflicting links is received.

28. The non-transitory computer-readable medium of claim 26, wherein the priority associated with the active link is determined by receiving a request to send (RTS) signal or a clear to send (CTS) signal.

29. The method of claim 1, wherein the link comprises a first device and a second device, the determining the degree comprising:
    determining a first number of links including at least one of a number of links to which the first device can yield or a number of links that can yield to the first device;
    receiving a second number of links including at least one of a number of links to which the second device can yield or a number of links that can yield to the second device; and
    determining the degree based on the first number of links and the second number of links.

30. The apparatus of claim 8, wherein the link comprises a first device and a second device, the means for determining the degree configured to:
    determine a first number of links including at least one of a number of links to which the first device can yield or a number of links that can yield to the first device;
    receive a second number of links including at least one of a number of links to which the second device can yield or a number of links that can yield to the second device; and
    determine the degree based on the first number of links and the second number of links.

31. The apparatus of claim 15, wherein the link comprises a first device and a second device, the processing system configured to determine the degree further configured to:
    determine a first number of links including at least one of a number of links to which the first device can yield or a number of links that can yield to the first device;
    receive a second number of links including at least one of a number of links to which the second device can yield or a number of links that can yield to the second device; and
    determine the degree based on the first number of links and the second number of links.

32. The non-transitory computer-readable medium of claim 22, wherein the link comprises a first device and a second device, the code for determining the degree configured to:
    determine a first number of links including at least one of a number of links to which the first device can yield or a number of links that can yield to the first device;
    receive a second number of links including at least one of a number of links to which the second device can yield or a number of links that can yield to the second device; and
    determine the degree based on the first number of links and the second number of links.

33. The method of claim 1, wherein each of the one or more resource elements occupy a same symbol position in each of a plurality of subblocks in a scheduling channel.

34. The method of claim 1, wherein the medium access priority of the link is proportional to the data rate of the link.

35. The method of claim 34, wherein the medium access priority of the link is inversely proportional to the degree of the link.

36. The method of claim 1, wherein the ratio corresponds to a marginal increment in a utility of the link if the link is scheduled for transmission.

\* \* \* \* \*